United States Patent

[11] 3,586,869

[72] Inventor Arlon D. Kompelien
 Richfield, Minn.
[21] Appl. No. 856,055
[22] Filed Sept. 8, 1969
[45] Patented June 22, 1971
[73] Assignee Honeywell Inc.
 Minneapolis, Minn.

[54] SEQUENCING CONTROL UNIT
 10 Claims, 4 Drawing Figs.
[52] U.S. Cl. .................................................. 307/41,
 307/117
[51] Int. Cl. ...................................................... H02j 3/00
[50] Field of Search ........................................ 307/41,
 116, 117, 118, 121

[56] References Cited
 UNITED STATES PATENTS
 3,496,337 2/1970 Voglesonger .................. 307/41 X Primary Examiner—Robert K. Schaefer
Assistant Examiner—H. S. Hohauser
Attorneys—Lamont B. Koontz, Francis A. Sirr and Alfred N. Feldman ABSTRACT: A sequencing type of control unit means particularly useful for sequencing stages of electric heat in response to a condition-sensing means or thermostat is disclosed. The sequencing type of control unit has an increasing current flow created within it in response to a variation of the condition-sensing thermostat, and this increasing current flow is directed to a number of bistable electronic switches. Each of the electronic switches is capable of adding a stage of electric heat as the switches are operated. The electronic switches are separated by diodes and provide the necessary differential so that the stages of electric heat are added or subtracted in response to a change in demand of the condition-sensing thermostat.

PATENTED JUN 22 1971

INVENTOR.
ARLON D. KOMPELIEN

BY Alfred N. Feldman

ATTORNEY.

3,586,869

SEQUENCING CONTROL UNIT

BACKGROUND OF THE INVENTION

The present invention is directed to a control unit means that is capable of sequencing a number of stages in response to a sensor but has particular utility in the field of temperature control where the sensor is a modulating type of thermostat and the load is made up of a plurality of electric heaters.

In electric heat systems currently in use the sequencing of the necessary heaters is accomplished by the use of mechanical or electromechanical equipment such as a group of driven cams that sequence mechanical switches to progressively turn "on" or "off" the necessary electric heaters. These systems have the usual problems and deficiencies of mechanically operated systems and can now be replaced by the full solid-state type system of the present invention.

SUMMARY OF THE INVENTION

The present invention relates to a completely solid-state condition control system and particularly to a temperature control system in which a solid-state thermostat operates through the expediency of a completely solid-state control unit means or sequencer means that properly sequences "on" and "off" a number of electric heaters and other equipment to provide for a modulating electric heat system.

The unique circuitry contained in the control unit means or sequencer means provides for positive steps of energization of appropriate output circuits so that individual electric heaters can be progressively added or subtracted to the system on the demand of the condition-sensing means or thermostat. The electronic circuitry that is utilized in the control unit means can be fabricated either of discrete components or in integrated form without the loss of the desired sequencing function.

DESCRIPTION OF THE PREFERRED EMBODIMENT

Figure 1:
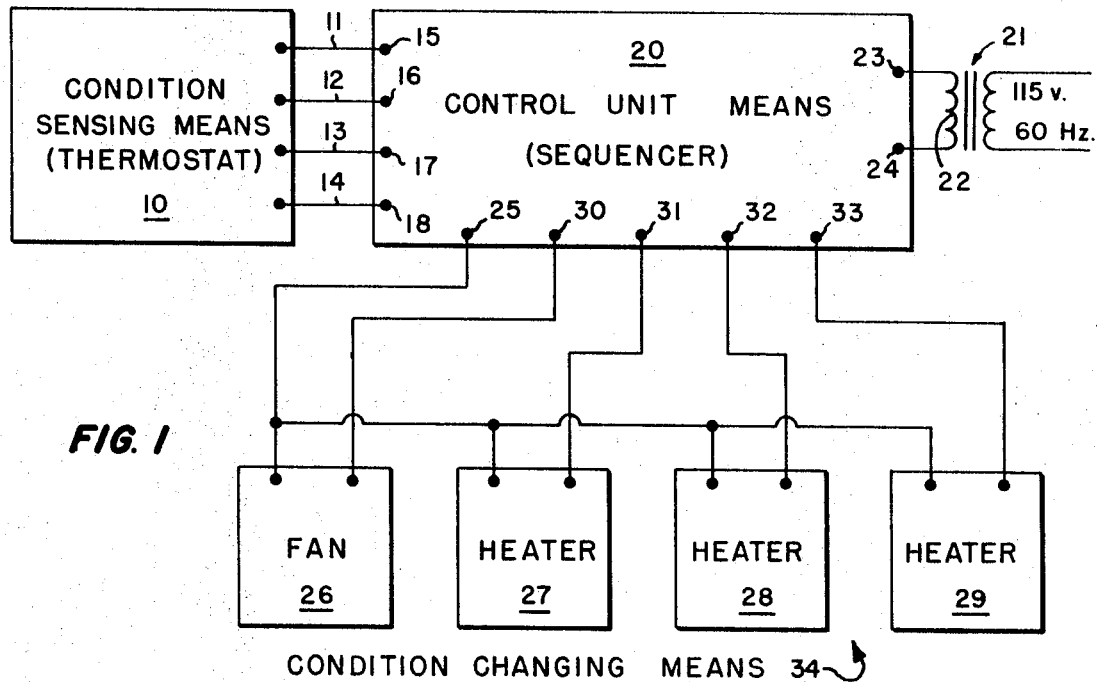
FIG. 1 is a block diagram representation of a complete condition control system in the form of an electric heating system disclosing the thermostat means and heaters as well as the novel control unit means or sequencer means.

A complete condition control system is disclosed in block diagram in FIG. 1. While a condition control system is disclosed, it should be understood that a particularly useful application of this system is in the temperature control field and particularly in the electric heat temperature control field.

A condition-sensing means or thermostat means 10 is provided and is connected by conductors 11, 12, 13, and 14 to terminals 15, 16, 17, and 18 of a control unit means or sequencer means 20. The condition sensing means or thermostat means 10 can be of a type similar to that disclosed in the Balthasar H. Pinckaers patent application Ser. No. 700,770 filed in the United States on Jan. 26, 1968 and entitled "Temperature Control System," or can be of a type disclosed in the Balthasar H. Pinckaers application Ser. No. 771,529 filed in the United States on Oct. 28, 1968 and entitled "Adjustable Amplifier System." The heating control portion of the adjustable amplifier system disclosed in the second-noted Pinckaers application corresponds generally with the condition sensing means or thermostat means 10 of the present application.

Terminal 15 and conductor 11 supply power to the condition-sensing means 10 while conductor 12 and terminal 16 provide for control of the control unit means 20. The conductor 13 and terminal 17 provide for a heat anticipation circuit which is normally used in temperature control applications. The conductor 14 and terminal 18 form a common or grounded circuit connection for the electronics contained in the overall system. The control unit means or sequencer means 20 is energized from a conventional powerline through transformer 21 which has a secondary winding 22 connected to a pair of terminals 23 and 24 to supply power to the system.

The control unit means or sequencer means 20 has a common terminal 25. A fan 26 is connected to terminal 30 of the control unit means or sequencer means 20 while electric heaters 27, 28, and 29 are connected to terminals 31, 32, and 33 respectively of the control unit means 20. The fan 26 and the heaters 27, 28, and 29 form a condition-changing means 34 that is capable of changing the temperature or condition at the condition-sensing means or thermostat 10 in response to a variation of the condition-sensing means 10 from a preset condition. In conventional electric heat control systems the control unit means 20 would be an electromechanical sequencer but in the present application a unique control unit of a completely electronic nature is provided and is described in the present application in detail. The entire electronics of the control unit means 20 is disclosed in FIG. 4 and will be discussed subsequently in detail after an explanation of a critical bistable switching means that is contained within the circuitry of the control unit means 20.

Figure 2:
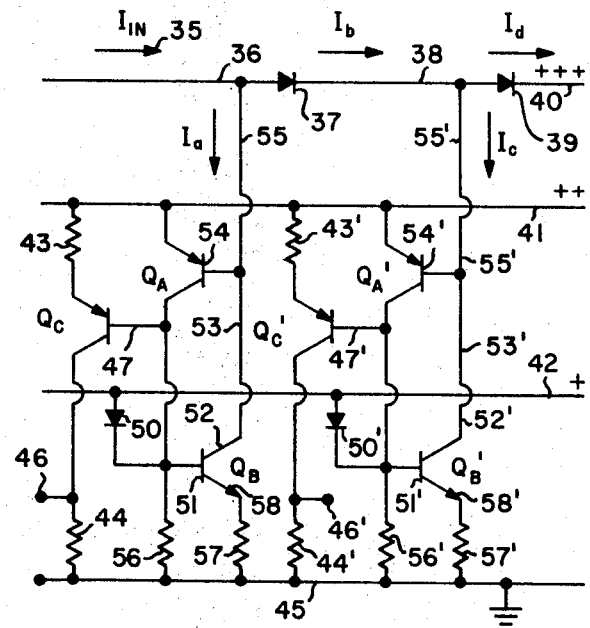
FIG. 2 is a portion of circuitry contained in the control unit means and is disclosed in discrete component form.

In FIG. 2 there is disclosed a discrete component version of a portion of the control unit means 20. The discrete component circuit of FIG. 2 contains two of the bistable switch means so that an explanation of the operation of the basic circuit can be provided. In the system disclosed in FIG. 4 in an integrated form, three stages or bistable switch means are utilized. The number of bistable switch means that can be placed in an actual system is limited only by the number of stages desired, and in the actual unit being produced according to the present invention as many as six stages of electric heat are actually provided.

Figure 4:
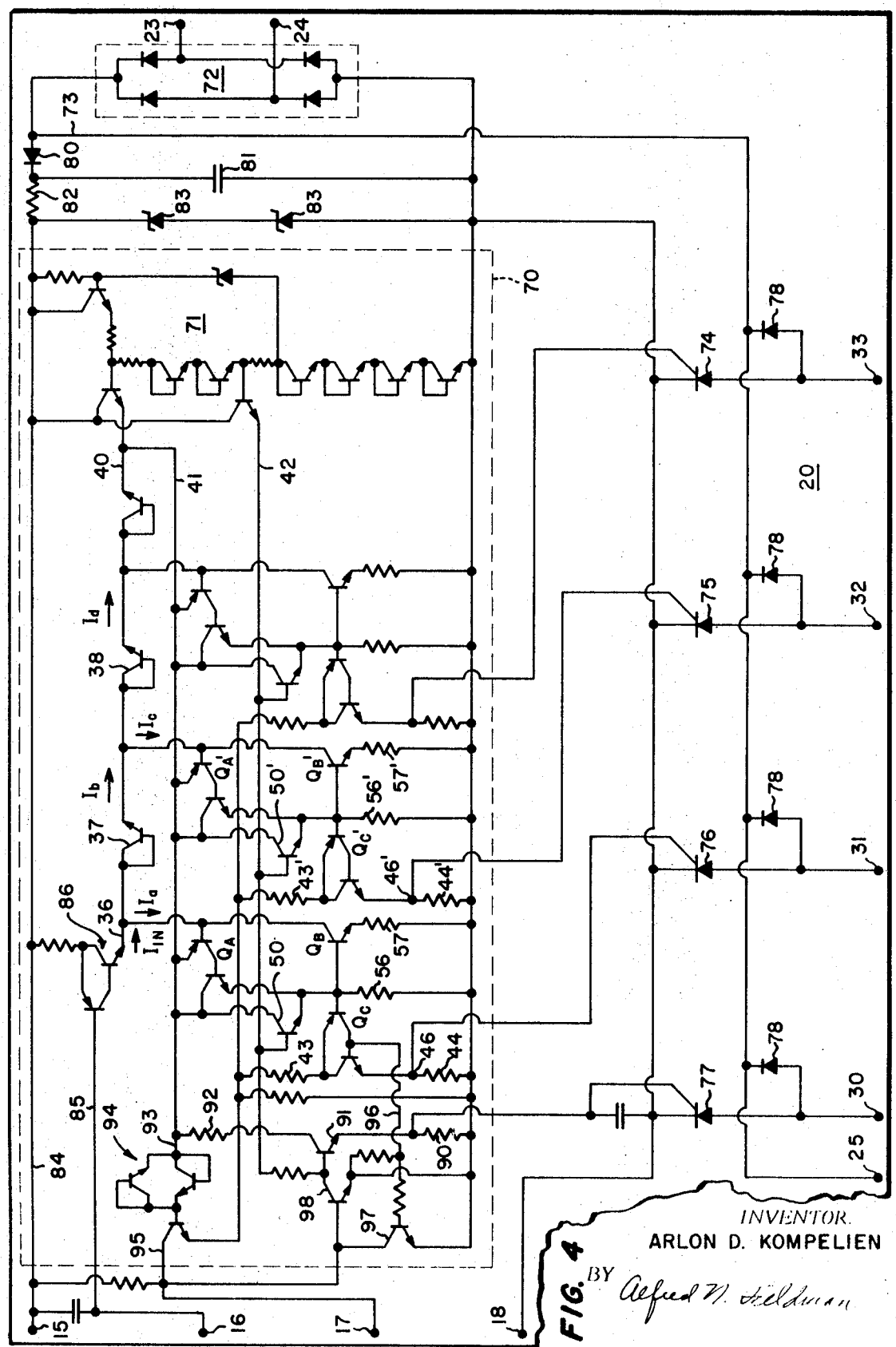
FIG. 4 is a complete circuit disclosing the control unit means of FIG. 1.

As the condition sensing means or thermostat 10 of FIG. 1 senses a deviation of temperature from the set temperature, a voltage change is provided on conductor 12 to terminal 16 which causes the control unit means or sequencer 20 to have an increased current flow therein by the change of a bias or control on a transistor circuit. This circuit in turn causes an increase in control current flow that has been designated as $I_{in}$ in FIG. 2. Current $I_{in}$ is designated 35 in FIG. 2 and occurs in conductor 36. Conductor 36 is connected by an asymmetric current conducting means or diode 37 via conductor 38 to a second diode 39 to a supply of voltage 40. The supply 40 has been indicated as having a positive potential by the indication of three plus signs. Two further sources of positive potential 41 and 42 are indicated by a pair of plus signs and a single plus sign to indicate the relative magnitudes of the potentials available at 40, 41, and 42. The potentials supplied come from a regulated power supply within the control unit means 20 as will become apparent when FIG. 4 is discussed.

Connected to the potential 41 is a resistor 43 and a transistor $Q_C$ along with a resistor 44 to a ground conductor 45. As will be developed later a potential is generated across resistor 44 and is taken from a terminal 46 to be used to switch silicon-controlled rectifiers which act along with the electric heaters to form the condition-changing means for the system. Connected to the base of transistor $Q_C$ is a conductor 47 that is connected in turn to a diode 50 which is further connected to conductor 42. The diode 50 clamps the potential on conductor 47 in the operation of the bistable switch means that is to be discussed. A transistor $Q_A$ is connected with its emitter and collector between the conductor 41 and the base 51 of a transistor $Q_B$ along with $Q_C$ base conductor 47. The transistor $Q_B$ has its collector 52 connected by conductor 53 to the base 54 of transistor $Q_A$ and by a conductor 55 to the conductor 36 where the input or control current $I_{in}$ is supplied. A resistor 56 connects the base 51 of transistor $Q_B$ to the ground conductor 45 while a resistor 57 connects the emitter 58 of $Q_B$ to the ground conductor 45. The circuitry thus far outlined constitutes a bistable switch means and since each succeeding bistable switch means stage is identical, the stage will carry the same numerical designation but will be primed to indicate the fact that it is the second or further bistable switch means circuitry of the system.

The bistable switch means operation can be described in accordance with the circuit shown in FIG. 2. Voltage at 41 is larger than voltage at 42, however, both are considerably lower than the main direct current supply voltage. This allows for the design of a current supply source for current $I_{in}$. With $I_{in}$ at zero, $Q_A$ is saturated "on" by the collector current of $Q_B$. The voltage at the base of $Q_B$ is then near the value of 41 with the voltage across resistor 57 approximately 0.7 volts less. Assuming a high gain in transistor $Q_B$, the collector current of $Q_B$ is roughly equal to the current through resistor 57. Under this condition the collector current to $Q_B$ is the sum of the base current in $Q_A$ and $I_{in}$. Assuming a high gain for transistor $Q_A$, $Q_A$ will remain saturated "on" and maintains the collector current of $Q_B$ as long as $I_{in}$ is slightly less than the collector current of $Q_B$. Under this condition $I_a$ or the current in conductor 55, equals $I_{in}$ and the current $I_b$ through diode 37 equals zero since the diode 37 requires a few tenths volts forward bias for appreciable current to flow. With the emitter-base voltage drops of $Q_A$ and $Q_A'$ being the same, there is no forward bias to diode 37.

At the point where $I_{in}$ increases to a value approximately equal to the collector current of $Q_B$, while $Q_B$ is still controlled by the voltage 41 with $Q_A$ "on," $Q_A$ begins to turn "off." When this happens, the base voltage of $Q_B$ begins to drop, reducing the collector current of $Q_B$. The first reduction in the $Q_B$ collector current quickly reduces the base current of $Q_A$ to zero, turning $Q_A$ completely "off." This is a sharp switching action where the base voltage of $Q_B$ drops to a value where diode 50 becomes forward biased. At this point the collector current of transistor $Q_B$ drops to a new value determined by the voltage at 42. Assuming $I_{in}$ does not further change and the value of $I_a$ on conductor 55 is equal to the collector current of $Q_B$ after this snap action, the voltage at conductor 36 rises until diode 37 becomes forward biased and the excess $I_{in}$ above $I_a$ under this condition becomes the value of $I_b$ through the diode 37. This value of $I_b$ is less than the value of $I_{in}$ which caused the switching action since $I_a$ does not drop to zero. If the current $I_b$ becomes the input current to a succeeding identical stage, $I_{in}$ must be increased by the switched value of $I_a$ to also switch the succeeding stage.

In the case that $I_{in}$ is decreased after $Q_A$ is switched to an "off" state, $I_b$ must reduce to zero before $I_a$ reduces to allow base current to again flow in transistor $Q_A$. At the point where this base current just begins to flow, the base voltage of $Q_B$ is further increased by increasing the base current of $Q_A$. This causes transistor $Q_A$ to switch "on" to a saturated value and the collector current of $Q_B$ jumps to its initial value. The single stage differential between the bistable switch means is therefore equal to the switching current change necessary in the collector current of $Q_B$.

As current $I_{in}$ increases to the point where the first stage operates and $I_b$ increases to the point where the second stage operates, current flow $I_c$ in conductor 55' suddenly decreases as $I_a$ did and the excess current $I_b$ again flows through a subsequent diode 39. The diode 39, after the last stage, is connected to the voltage supply to provide a dump path for the excess current $I_{in}$ above that required to operate the last stage. This means that as the current $I_{in}$ increases above that required to operate all of the bistable switch means the increasing current, should it occur, is merely dumped to the power supply and does not affect the operation of the device further.

Figure 3:
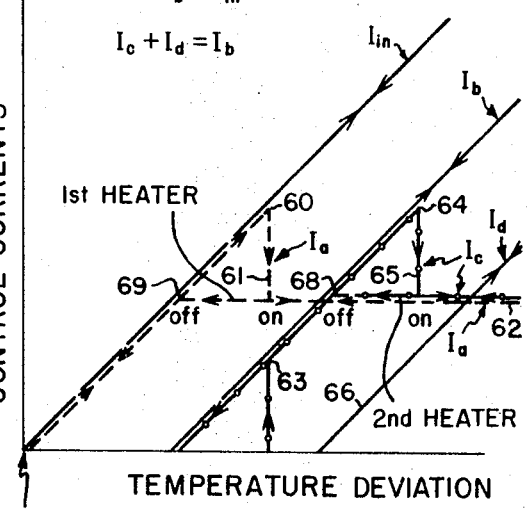
FIG. 3 is a graph of a control current within the control unit means versus the deviation of temperature from a setpoint temperature.

FIG. 3 is a graph of the control currents versus the temperature deviation at the condition-sensing means or thermostat 10 from the setpoint. The setpoint has been indicated as the zero point. $I_{in}$ increases until a point 60 is reached at which time the first bistable switch means operates and $Q_A$ turns "off." At this point $I_{in}$ and $I_a$ are equal to one another and no current flows in diode 37. The operation of the bistable switch at point 60 causes a change in voltage across resistor 56 which is coupled by conductor 47 to transistor $Q_C$ which in turn changes the voltage across resistor 44 and provides an output at terminal 46.

$I_a$ drops at 61 to a constant level 62 and remains at 62 as the diode 37 becomes conductive and current $I_b$ jumps to a value as is shown at 63. At point 64, $I_c$ which has up to this time been the same as $I_b$, changes abruptly at 65 with the switching of transistor $Q_A$, to turn "on" the second stage of electric heat. Current $I_d$ then flows along a line 66.

On a decrease in the control current 35, which represents a movement of the temperature towards the setpoint, a current such as $I_c$ flows until its value intersects the curve $I_b$ at 68 and the stage $Q_A$, again switches so that $Q_A$, is saturated "on." The difference between the points 64 and 68 on the curve $I_b$ is the differential for the bistable switch means between the "on" and "off" state for the second heater. As the control current 35 decreases until $I_a$ equals $I_{in}$, point 69 is reached at which time the first bistable switch means operates to turn "off" the first heater.

It will be understood that only two stages of a multiple-stage device have been disclosed and that it is obvious that as current increases each subsequent bistable switch means operates and then decreases in its current demand to forward bias the next asymmetric current conducting means or diode to activate the subsequent stage. This action, as previously indicated, can be applied to as many stages of bistable switch means as is needed to build up the desired control system.

In FIG. 4 there is disclosed a complete circuit diagram of the control unit means or sequencer 20. The control unit means or sequencer 20 includes an integrated circuit 70 which has been blocked out in a dotted box. The integrated circuit 70 includes a regulated power supply generally disclosed at 71 which applies the potential on conductors 40, 41 and 42 as previously described. The input terminals 23 and 24, which have been previously indicated as connected to the power source, supply energy to a full-wave bridge 72 that provides voltage on conductor 73 that is full wave rectified but unfiltered. This supply is provided so that silicon-controlled rectifiers 74, 75, 76, and 77 will turn "off" at an appropriate time to control the condition changing means 34. Since the condition changing means 34 includes a fan 26, and heaters 27, 28, and 29, which may be in turn operated by relays, diodes 78 have been provided as freewheeling diodes in a well-known manner in the solid-state control art. The power supply 72 also includes a diode 80 and a capacitor 81 to supply a regulated and filtered direct current via resistor 82 and Zener diodes 83 to the integrated circuit 70.

The integrated circuit 70 has connections at terminals 15, 16, 17, and 18 as disclosed in FIG. 1. Terminal 15 supplies energy from a conductor 84 to the condition-sensing means or thermostat 10 and receives back on conductor 85 a potential that varies with the condition being sensed. The conductor 85 is connected to a pair of transistors generally shown at 86. In integrated circuit work the fabrication of both PNP- and NPN-type transistors of a high-gain type is very difficult, and therefore an effective PNP-type transistor is created by the fabrication of a pair of transistors which function as a PNP. The pair of transistors in fact is a PNP transistor coupled with an NPN transistor but the coupled pair or effective pair operate in the same manner as a high-gain PNP-type transistor. The effective PNP transistor 86 is connected to conductor 36 in the integrated circuit 70 in the same manner as the circuit of FIG. 2. Also in integrated circuit work it is more practical to provide a diode in the form of a transistor with a short between the collector and the base, and therefore the diodes in the integrated form are made up in this fashion. The circuit components comparing to FIG. 2 have been marked with numbering and lettering corresponding to that used in FIG. 2. It will thus be apparent that the current $I_{in}$ has been supplied on conductor 36 to the series connection of diodes 37 and 38 and a subsequent diode for a third stage which has not been marked. Current $I_{in}$ basically follows the path of $I_a$ initially to transistors $Q_A$ and $Q_B$. Transistor $Q_A$ again is an effective pair of transistors made up of an NPN and PNP transistors to provide a high-gain PNP type transistor. The balance of the circuit is substantially the same as that of FIG. 2 and will not be discussed in detail. It is merely enough to state that as current $I_a$ flows to the transistors $Q_A$ and $Q_B$, a switching action takes place that provides a potential across resistor 44 to terminal 46 that is connected to the silicon-controlled rectifier 76. The silicon-controlled rectifier 76 in turn conducts through terminal 31 which is connected to the heater 27 of FIG. 1 as a portion of the condition-changing means 34. As the subsequent stages each are energized, the subsequent circuits including the silicon-controlled rectifiers 75 and 74 are activated to bring in the heaters 28 and 29.

The fan 26 of FIG. 1 is connected to the silicon-controlled rectifier 77 of FIG. 4 which has its gate connected across resistor 90 that is in series with a transistor 91 and resistor 92. This connects to a circuit 93 that is connected through a pair of diodes generally shown at 94 to a conductor 95 that is connected to the terminal 17 of the control unit means 20. This circuit provides for heat anticipation current drawn through the condition-sensing means or thermostat 10 of FIG. 1 in a proportional manner to the number of heating stages "on."

The operation of the first heating stage of transistor $Q_C$ is coupled on conductor 96 to the input of the transistor stages that activate the fan 26. This is accomplished by the control of transistors 97 and 98 so that the fan is energized by the means of the silicon-controlled rectifier 77 whenever the first stage of electric heat or the operation of the silicon-controlled rectifier 76 occurs. This circuitry could be accomplished in any number of different ways and does not form a direct part of the present invention.

In overall operation, when the condition-sensing means or thermostat 10 of FIG. 1 deviates from the setpoint condition, a potential is conducted to terminal 16 of FIG. 4 which causes transistor 86 to conduct and supply the current $I_{in}$ to the various stages for sequentially operating the silicon-controlled rectifiers 76, 75, and 74 which in turn bring on the heaters 27, 28, and 29 as needed. As soon as the first silicon-controlled rectifier 76 fires to turn the heater 27 "on," the change in voltage at $Q_C$ is coupled back on conductor 96 to the transistors 97 and 98 to in turn cause the transistor 91 to conduct and generate a voltage across resistor 90 to trigger the silicon-controlled rectifier 77 into conduction to energize the fan 26. A current flow in stages 97 and 98 also is drawn from the terminal 17 as a means of obtaining a proportional current in the condition-sensing means or thermostat 10 for heat anticipation purposes, as is well known in the thermostat or temperature control art.

The system as described contains only three bistable switch means and three heaters. As has been previously indicated any number of stages can be used and in the actual embodiment being produced in integrated form six stages of electric heat plus various other functions not related to the present invention are involved. It is quite apparent that the present condition control unit means 20 is a fully transistorized and substantially integrated sequencing device that is capable of sequencing "on" and "off" a plurality of electric loads. The present control unit means 20 provides the necessary differential to operate a number of loads sequentially and this differential function has not been economically available in anything but mechanical and electromechanical type devices in the past.

While an overall condition control system including a condition-sensing means and the control unit means along with condition-changing means have been disclosed, the present invention is specifically directed to the control unit means itself since the condition-sensing means or thermostat 10 and the condition-changing means 34 in the form of a fan and electric heaters are old. One specific preferred embodiment of the control unit means in the form of an integrated arrangement including bistable switch means has been specifically disclosed. It is quite obvious that the concept involved of the operation of bistable switch means that are separated by back-biased diodes for sequencing could be accomplished with circuitry other than the specific circuitry disclosed and therefore the applicant wishes to be limited in the scope of his invention solely by the scope of the appended claims.

The embodiments of the invention in which I claim an exclusive property or right are defined as follows:

1. A control unit means that responds to condition-sensing means wherein an increasing condition deviation from a set condition at said condition-sensing means causes a varying current flow in said control unit means, including: control unit means adapted to sequentially energize a plurality of condition-changing means, and further adapted to be connected to condition-sensing means with said control unit means having an increasing control current flow as said sensing means deviates from a set condition; said control unit means including first current-operated bistable switch means which switches at a set control current level and then changes to and remains switched at a lower fixed current level; said switch means being connected to receive said control current flow and responsively energizing a first of said condition-changing means; said first bistable switch means then remaining switched at said lower current level; asymmetric current-conducting means and further bistable switch means connected to said first bistable switch means to receive control current flow above said switched current level of said first bistable switch means after said switch means switches; said further bistable switch means connected to energize further condition-changing means as said further bistable switch means switch.

2. A control unit means as described in claim 1 wherein said current-operated bistable switch means are semiconductor switch means.

3. A control unit means as described in claim 2 wherein said semiconductor switch means each effectively includes a complementary pair of transistors with a first of said transistors initially biased to a conductive state while a second transistor of said pair is connected to receive said control current flow thereby causing said first transistor to become nonconductive when said second transistor is in a conductive state to in turn provide an output voltage to operate said condition-changing means.

4. A control unit means as described in claim 1 wherein said asymmetric current-conducting means is a diode.

5. A control unit means as described in claim 1 wherein said asymmetric current-conducting means is a diode and said current-operated bistable switch means are semiconductor switch means each effectively including a complementary pair of transistors with a first of said transistors initially biased to a conductive state while a second transistor of said pair is connected to receive said control current flow thereby causing said first transistor to become nonconductive when said second transistor is in a conductive state to in turn provide an output voltage to operate said condition changing means.

6. A control unit means as described in claim 1 wherein said control unit means is electric heat sequencing unit means adapted to sequentially energize a plurality of electric heaters and further adapted to be connected to thermostat means with said electric heat sequencing unit means having increasing control current flow as said thermostat means responds to a deviation from a set temperature.

7. An electric heat sequencing unit means as described in claim 6 wherein said current-operated bistable switch means are semiconductor switch means.

8. An electric heat sequencing unit means as described in claim 7 wherein said semiconductor switch means each effectively includes a complementary pair of transistors with a first of said transistors initially biased to a conductive state while a second transistor of said pair is connected to receive said control current flow thereby causing said first transistor to become nonconductive when said second transistor is in a conductive state to in turn provide an output voltage to energize said electric heaters.

9. An electric heat sequencing unit means as described in claim 6 wherein said asymmetric current-conducting means is a diode.

10. An electric heat sequencing unit means as described in claim 9 wherein said asymmetric current-conducting means is a diode and said current-operated bistable switch means are semiconductor switch means each effectively including a complementary pair of transistors with a first of said transistors initially biased to a conductive state while a second transistor of said pair is connected to receive said control current flow thereby causing said first transistor to become nonconductive when said second transistor is in a conductive state to in turn provide an output voltage to operate said electric heaters.